Jan. 16, 1962   J. M. LADD   3,016,702
BLEED VALVE ACTUATION
Filed May 14, 1956   2 Sheets-Sheet 1
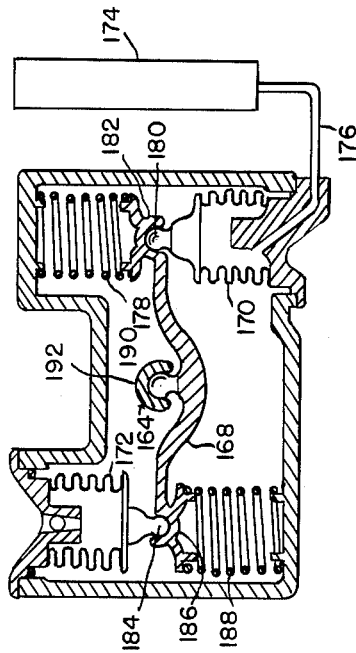
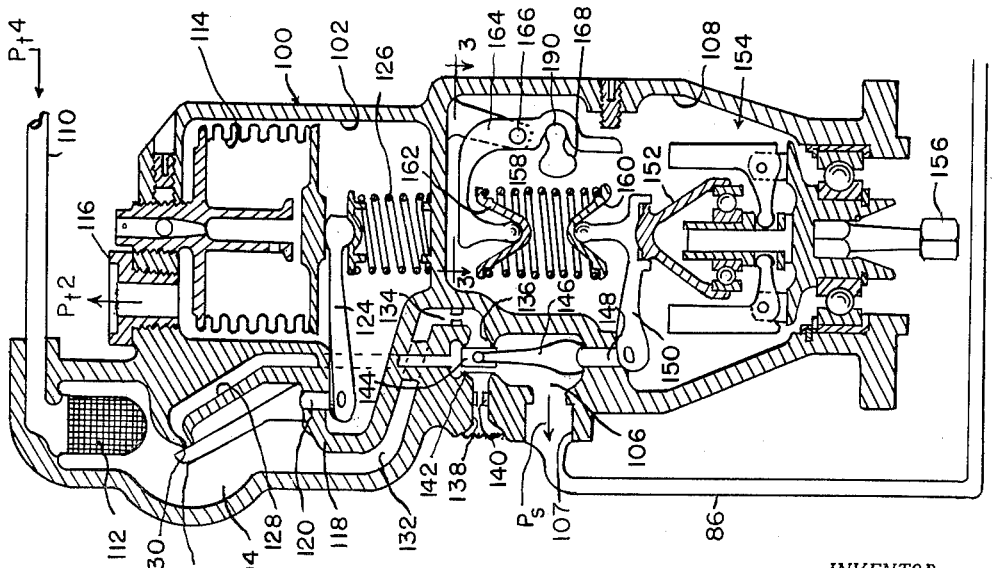
INVENTOR.
JOSEPH M. LADD
BY Whittemore
Hulbert & Belknap
ATTORNEYS

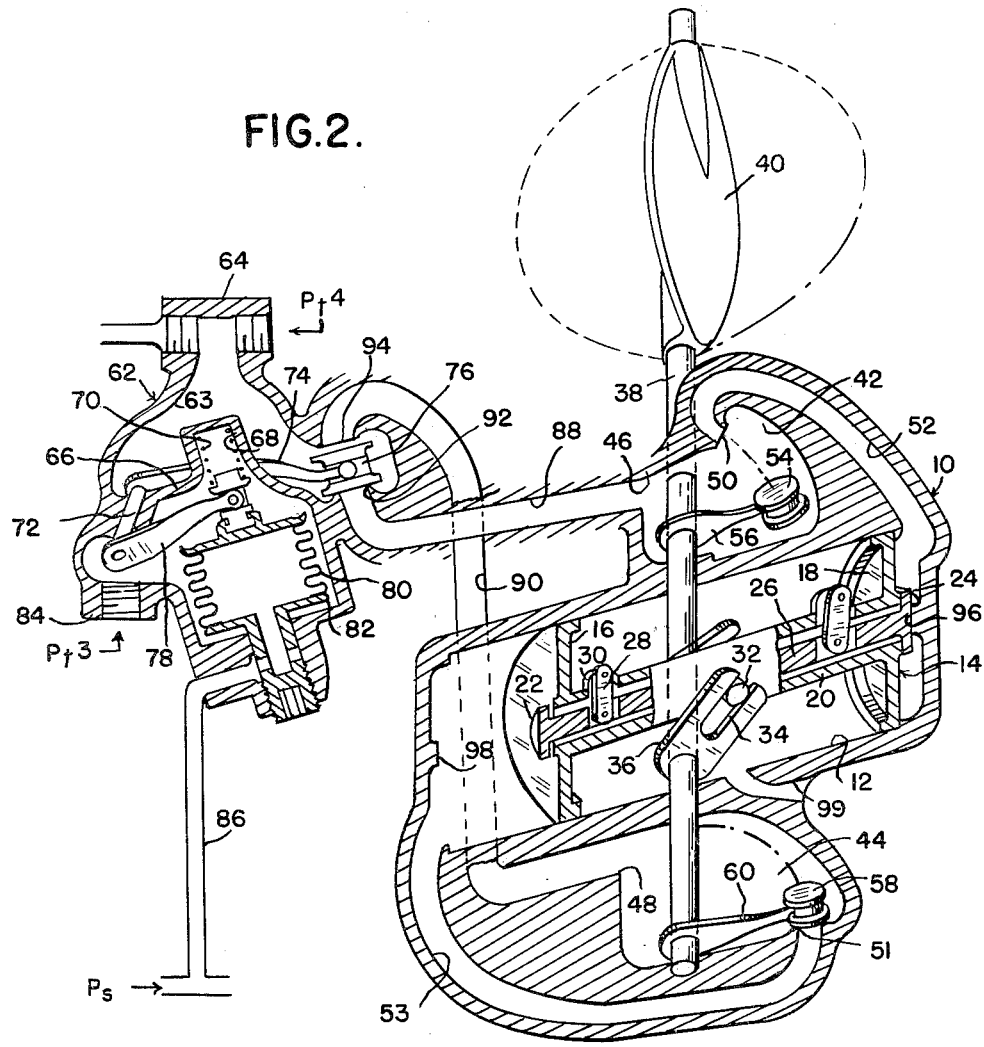

United States Patent Office 3,016,702
Patented Jan. 16, 1962

3,016,702
BLEED VALVE ACTUATION
Joseph M. Ladd, Hamtramck, Mich., assignor to Holley Carburetor Company, Van Dyke, Mich., a corporation of Michigan
Filed May 14, 1956, Ser. No. 584,851
11 Claims. (Cl. 60—39.29)

The present invention relates to bleed valve actuation and represents an improvement over subject matter claimed in my prior copending application, Serial No. 577,910, filed March 26, 1956.

It is an object of the present invention to provide mechanism for opening and closing a bleed valve between stages of a multiple air compressor employed in an internal combustion engine such for example as an aircraft jet engine.

It is a further object of the present invention to provide bleed valve actuating mechanism having connections both to the outlet and to an intermediate portion between stages of the compressor.

It is a further object of the present invention to provide fluid pressure operated bleed valve control mechanism characterized by its relative insensitivity to pressure loss in a controlled signal pressure line.

It is a further object of the present invention to provide bleed valve actuating mechanism including a speed, temperature and altitude responsive pressure regulating unit characterized in the disposition of fluid passages which causes the flow of air to assist bleed valve actuation in response to an increase in engine speed, and characterized further in that the signal fluid is discharged directly from the unit housing without contaminating control instrumentalities.

Other objects and features of the invention will become apparent as the description proceeds, especially when taken in conjunction with the accompanying drawings, wherein:

FIGURE 1 is a diagrammatic sectional view of the pressure control unit.

FIGURE 2 is a diagrammatic sectional view of the bleed valve motor and control valve therefor.

FIGURE 3 is a fragmentary sectional view on the line 3—3, FIGURE 1.

The bleed valve actuating mechanism comprises a motor 10 including a cylinder 12 having a compound piston 14 movable longitudinally therein. The piston 14 comprises spaced heads 16 and 18 interconnected by a tube 20, the opening through the tube constituting valve ports at opposite ends thereof adapted to be respectively opened and closed by valve elements 22 and 24 interconnected by a valve stem 26. The valve stem 26 is connected by links 28 to posts 30 to provide for free movement of the valves 22 and 24. It will be appreciated that the openings in the tube 20 which receive the links 28 also provide for escape of fluid therethrough.

Intermediate its ends the tube 20 is provided with radially projecting pins 32 which are slidable in slots 34 in crank arms 36 fixed to the bleed valve operating shaft 38, the bleed valve being indicated at 40 in open position.

The motor 10 includes chambers 42 and 44 provided respectively with inlet ports 46 and 48 and outlet ports 50 and 51 which communicate respectively with opposite ends of the cylinder 12 by passages 52 and 53 respectively. In the chamber 42 a valve 54 is carried by an arm 56 fixed to the shaft 38. In like manner, a valve 58 is carried by an arm 60 also affixed to the shaft 38.

A motor control valve for the motor 10 comprises a housing 62 having an internal chamber 63 and a coupling portion 64 adapted to be connected by a suitable conduit to the air compressor of the engine and particularly to the discharge or outlet end thereof. Accordingly, the internal chamber 63 is provided with fluid under the discharge pressure of the compressor, this fluid pressure being designated here as $P_t4$. The valve housing 62 is provided with a partition 66 having a recess portion 68 containing a compression spring 70. Extending through and journaled in an opening in the partition is a shaft 72, the end of the shaft within the chamber 63 having an arm 74 fixed thereto, the arm having at its outer end a movable valve element 76. At its opposite end the shaft 72 has fixed thereto an arm 78 one end of which is connected to the movable end of a bellows 80. The compression spring 70 previously referred to is connected to the free end of the arm 78 and acts to compress the bellows 80. The bellows 80 is located beneath the partition 66 in a chamber 82 which is provided with a coupling 84 adapted to be connected by a conduit to an intermediate portion between successive stages of the air compressor. Accordingly, the interior of the chamber 82 and the outside of the bellows 80 are subjected to a fluid under an intermediate pressure existing between stages of the multiple stage air compressor, such pressure being referred to herein as $P_t3$.

By mechanism subsequently to be described, a signal pressure is introduced through a conduit 86 to the interior of the bellows 80. This signal pressure may attain a value approaching compressor outlet pressure $P_t4$ and it may be reduced to a value approaching ambient air pressure, substantially below the intermediate compressor pressure $P_t3$.

The motor control valve housing 62 is interconnected to the ports 46 and 48 of the motor 10 by passages 88 and 90 respectively. The passage 88 terminates in a port 92 illustrated in FIGURE 2 as closed by the valve 76. The passage 90 terminates in a port 94 which with the parts in the position illustrated in FIGURE 2, is open.

It will be observed that the valve 76 is in the position which it will occupy when intermediate pressure $P_t3$ exceeds signal pressure $P_s$. At this time the relatively high discharge pressure $P_t4$ passes through the port 94, passage 90, port 48, into the chamber 44 where it acts on valve element 58 and holds it on the seat provided by the port 51. If now, it is assumed that signal pressure $P_s$ increases to a value exceeding intermediate pressure $P_t3$, the bellows 80 expands, valve 76 shifts upwardly to close the port 94 and to open the port 92. At this time fluid under the relatively high pressure $P_t4$ will flow through the passage 88 into the chamber 42, thence past the port 50, through the passage 52 into the right hand end of the cylinder 12. At this time the valve 24 is in closing relation as a result of engagement against an abutment 96. Accordingly, the piston 14 is shifted to the left, moving the bleed valve 40 toward closed position. As the bleed valve 40 reaches closed position the valve 22 engages an abutment 98 at the opposite end of the cylinder 12 and the valve 54 closes the port 50. Initial movement of the piston 14 to the left was accompanied by opening movement of the valve 58 but the port 94 at this time is closed by the valve 76. Fluid displaced by movement of the piston 14 upon its movement to the left, passes into the tube 20 and out past the links 28 into the space between the heads 16 and 18 where it is vented through passage 99.

Referring now to FIGURES 1 and 3, the signal pressure control unit comprises a casing or housing 100 having partitions dividing the interior of the housing into an aneroid chamber 102, an inlet chamber 104, a signal chamber 106, and a governor chamber 108. A conduit 110 provides a connection for fluid under compressor outlet pressure $P_t4$ to the interior of the inlet chamber 104. A protective screen is indicated at 112. Within the aneroid chamber 102 is an evacuated bellows 114 and the interior of the aneroid chamber is subjected to ambient pressure $P_t2$ through a fitting 116 preferably provided with the protective screen illustrated. Extending through a partition 118 between the aneroid chamber 102 and the inlet chamber 104 is a pin 120 having at one end an aneroid valve element 122 and at its other end an arm 124 retained against the lower end of the bellows 114 by a compression spring 126.

A passage 128 is provided in the housing 100 extending from the inlet chamber 104 to the signal chamber 106 communicating with passage 107 to transmit the signal pressure to the conduit 86. At the end of the passage 128 within the inlet chamber 104 is a port 130 adapted to be closed by the aneroid valve 122 when ambient pressure $P_t2$ falls to a predetermined value determined by the altitude setting of the unit.

The inlet chamber 104 is connected by a passage 132 to the signal chamber, this passage having an inlet restriction 134 therein and terminating in an inlet valve port 136. The signal chamber 106 is provided with an exhaust passage 138 having an exhaust restriction 140 therein and terminating in an exhaust valve port 142. It will be observed that the inlet valve port 136 and the exhaust valve port 142 are in closely spaced confronting relationship. Intermediate these valve ports is a signal valve 144 carried by an arm 146 fixed to a pin 148 extending through a partition between the signal chamber 106 and the governor chamber 108.

Within the governor chamber 108 there is provided an arm 150 fixed to the pin 148 and engaging a head 152 of centrifugal speed responsive mechanism indicated generally at 154. This mechanism is adapted to be connected by a connector 156 to a rotating part driven by the engine and accordingly, the rotating centrifugal mechanism rotates at speeds dependent upon engine speed. As is apparent by inspection, an increase in engine speed results in forces tending to swing the pin 148 counterclockwise or to move the signal valve 144 away from inlet port 136 and toward exhaust port 142.

Upward movement of the head 152 of the centrifugal governor mechanism is opposed by a governor spring 158 compressed between spring seats 160 and 162. The spring seat 162 is adjustable in accordance with compressor inlet air temperature. This temperature may be substantially changed from ambient temperature due to the effect of inlet ducting to the engine. The mechanism best illustrated in FIGURE 3 is effective for this purpose.

The spring seat 162 is associated with an adjusting lever 164 pivoted as indicated at 166 and associated with an arm 168, best seen in FIGURE 3.

Located in the housing are a pair of bellows 170 and 172. The interior of the bellows 170 communicates with a fluid filled bulb 174 through a line 176, the bulb being exposed to the inlet of the compressor of the engine so as to provide a temperature response in accordance with the temperature of the inlet air to the compressor. Opposite the bellows 170 is a compression spring 178. The head of the bellows is provided with a ball 180 receivable in a socket 182 at one end of the balancing or integrating arm 168. The bellows 172 is designed to compensate for temperature differences originating within the control unit and to balance out the effect of such temperature. The head of the bellows 172 is provided with a ball 184 receivable in a socket 186 at the opposite end of the arm 168. A compression spring 188 opposes expansion movement of the bellows 172.

Intermediate its ends the arm 168 carries a ball 190 received in a socket 192 on the lever 164.

The arm 168 is thus not provided with a stationary or fixed axis but instead assumes positions as determined by condition of expansion of the bellows 170 and 172. Thus, for example, if the bellows 170 and 172 should expand equally from the condition shown in FIGURE 3 (as would be the case where there was a change in temperature of the control unit without change in ambient temperature), the arm 168 would merely rock about the center of the ball 190. On the other hand, a change in ambient temperature acting on the bulb 174 without change in unit temperature will result in rocking of the arm 168 about the axis determined by the ball head 184 of the bellows 172. This movement is effective to rock the lever 164 and will accordingly change the setting of the governor spring 158. This in turn changes the speed at which the centrifugal governor is effective to move signal valve 144, or at a given speed will affect the position of the signal valve 144.

For simplicity in description of operation, it is assumed that the bleed valve actuating mechanism disclosed herein is associated with a bleed valve 40 between the stages of a two-stage air compressor in an aircraft jet engine. It is a requirement that the bleed valve shall remain closed irrespective of engine operating conditions when the aircraft is below a minimum altitude, to avoid loss of power during landing and take-off and maneuvering at low altitude. The two stages of the air compressor are of course designed for maximum cooperative efficiency when the engine is operating at a high speed range. When operating above the minimum altitude and at a relatively low speed, efficient operation of the two stages of the air compressor is not obtained and in some conditions actual stalling of the second stage results. In order to prevent stalling of the second stage air compressor, it is desirable under these conditions to move the air compressor bleed valve 40 to fully open position.

When the aircraft attains the high speed range, the air compressor bleed valve 40 is moved to fully closed position and the engine accordingly throughout this high speed range delivers the full power for which it is designed.

The foregoing requirements are taken care of in an efficient manner by the bleed valve actuating mechanism disclosed herein. The parts illustrated in the figures are in the position which they assume when the aircraft is above predetermined minimum altitude and with the engine operating at less than the predetermined high speed range. In the following description, the effect of temperature may be ignored, but it will be understood that the results of variations in outside air temperature will change the setting of the centrifugal governor spring 158.

*Operation*

When the aircraft was below critical altitude, air pressure in the aneroid chamber 102 was relatively high and with the aid of the spring 126, was sufficient to collapse the aneroid bellows 114 to a position in which the aneroid valve 122 was maintained in open position. At this time the high compressor discharge pressure $P_t4$ passed through the passage 128 directly into the signal chamber 106. Still assuming low engine speed, high pressure air in the passage 132 was prevented from entering the signal chamber 106 by closure of the valve 144 against the port 136. The flow of air through the passage 128 into the signal chamber 106 produced an elevated pressure within this chamber determined by the effectiveness of the restriction 140 in the exhaust passage 138. In practice, the dimensions of the passages and restriction are such that at this time signal pressure $P_s$ will be a substantial fraction, as for example 80% of the high compressor discharge pressure $P_t4$. This high signal pressure $P_s$ entering through the conduit 86 into the valve control bellows 80, would maintain the bellows expanded and accordingly, hold the valve 76 in the upper position which would maintain the piston 14 to the left and the bleed valve 40 closed. This is the condition which it is essential to maintain irrespective of engine conditions when the aircraft is below predetermined altitude.

As the aircraft reaches the predetermined minimum altitude, the parts take the position illustrated in the figures. At this time decreasing ambient pressure $P_t2$ permits expansion of the partially evacuated bellows 114, moving the aneroid valve 122 to the closed position against the port 130 leading to the passage 128. Thus, flow of air to the signal chamber 106 through the substantially unrestricted passage 128 is cut off. At this time the only flow of air under pressure to the signal chamber 106 is through the passage 132 past the restriction 134 and the port 136.

It is assumed that in the illustrated condition, the aircraft has reached the predetermined lower limit of altitude while the engine is operating at a speed below the high speed range. Accordingly, at this time the governor spring 158 overbalances the effect of the centrifugal weights and maintains the signal valve 144 in closed relation to port 136. Accordingly, no air is admitted to the signal chamber 106, and the pressure therein accordingly falls to ambient pressure $P_t2$. It will also be observed that the arrangement of the passages within the housing 100 is such that air passing from the high pressure inlet chamber 104 is dumped directly to atmosphere rather than exhausting it into the governor chamber 108. This pressure is transmitted to the valve control bellows 80 and since this pressure is substantially less than the intermediate compressor pressure $P_t3$, the bellows 80 is compressed and the valve 76 moves to the position illustrated in FIGURE 2, with resultant movement of the piston 14 and bleed valve 14 to the illustrated positions as previously described.

Assuming now that while the aircraft remains above the lower predetermined limit of altitude, the engine speed increases to the lower limit of its high speed range. At this time the effect of the centrifugal unit 154 is to rock the pin 148 counterclockwise and accordingly shift the signal valve 144 away from the port 136 to the port 142. At this time it will be observed that the direction of flow of air through the passage 132 toward the exhaust passage 138 is such as to assist the governor in shifting the signal valve to the position which results in closure of the bleed vlave. As the signal valve 144 approaches the valve port 142 it moves to fully closed position as a result of increasing pressure within the signal chamber 106, and increasing flyweight force. With the valve 144 in fully closed position the pressure of fluid passing from inlet chamber 104 past the restriction 134 into the signal chamber 106 approaches compressor discharge pressure $P_t4$. This signal pressure being transmitted to the interior of the valve control bellows 80 expands the bellows and shifts the valve 76 to the upper position in closing relation to the port 94, thus effecting reverse movement of the piston 14 to the left and closing movement of the bleed valve 40.

It will be observed that the mechanism disclosed herein results in direct pressure differential actuation of the control valve 76 by subjecting the exterior of the valve control bellows 80 to intermediate pressure $P_t3$ and the interior of the bellows 80 to a signal pressure which may vary between limits approximating ambient pressure $P_t2$ and compressor discharge pressure $P_t4$. In general $P_t4/P_t2$ equals six and $P_t3/P_t2$ equals 3. By employing $P_t3$ as the pressure opposing signal pressure $P_s$ in the motor control valve actuating mechanism, a positive differential pressure is employed to move the bellows and accordingly the valve selector lever in either direction. The use of operating pressure differential represented by the difference between $P_t3$ and $P_s$ makes it possible to operate the unit at a relatively low $P_s/P_t4$ ratio. This means that any leak in the $P_s$ line will have a minimum effect on performance. This is particularly desirable since it is extremely difficult to completely eliminate leakage in the $P_s$ engine lines.

A second important advantage of the construction disclosed herein is in the direction of air flow past the governor lever and more particularly, past the signal valve 144. This has the effect of employing the differential pressure across the valve to assist the governor mechanism in shifting the valve upon increase in speed, thus rendering the mechanism more sensitive. It also provides for dumping the hot signal pressure directly to atmosphere rather than first running it over the control mechanism in the governor chamber 108. This keeps the mechanism therein cleaner and provides longer operational life.

By providing the illustrated direction of flow past the control valve 144 it is possible to provide the aneroid shut-off valve and lever in the inlet chamber 104 in which the compressor discharge pressure $P_t4$ prevails. Thus, the shaft 120 extends between the inlet chamber 104 at pressure $P_t4$ and the aneroid chamber 102 where the prevailing pressure is ambient pressure $P_t2$. Accordingly, any leakage past the shaft 120 does not affect the performance of the system.

The drawings and the foregoing specification constitute a description of the improved bleed valve actuation in such full, clear, concise and exact terms as to enable any person skilled in the art to practice the invention, the scope of which is indicated by the appended claims.

What I claim as my invention is:

1. In altitude and speed responsive control mechanism for an internal combustion engine for controlling a signal pressure at values above and below a predetermined fraction of a supply pressure which comprises a compartment having an inlet port, a first passage connecting to a source of said supply pressure, an exhaust port, an exhaust passage connected to said exhaust port, and a signal transmission passage connected to said compartment, a restriction in said exhaust passage, another passage for delivering supply pressure to said compartment, an aneroid valve for closing said other passage upon attainment of a predetermined altitude, valve means for simultaneously opening one of said ports and closing the other to vary signal pressure from a value approaching supply pressure to exhaust back pressure when said aneroid valve is closed, the fluid supplied by said other passage when said valve means is in position to open said outlet port and said aneroid valve is open being sufficient to maintain signal pressure above the predetermined fraction of supply pressure.

2. A device as defined in claim 1 in which said first passage includes a restriction therein.

3. Mechanism for creating a variable pressure pneumatic signal in accordance with altitude and speed of an internal combustion engine comprising a control chamber having an outlet passage for transmitting chamber pressure as a pneumatic pressure signal, a relatively unrestricted inlet passage connecting said chamber to a source of fluid pressure, a shut-off valve responsive to altitude to prevent flow of fluid through said first passage above a predetermined altitude, a second inlet passage connecting said chamber to the same pressure source and terminating in said chamber in an inlet port, a relatively restricted exhaust passage having an exhaust port in said chamber, valve means in said chamber responsive to engine speed movable between a first position corresponding to low engine speed closing said inlet port and opening said exhaust port and a second position corresponding to high engine speed closing said exhaust port and opening said inlet port.

4. A device as defined in claim 3 in which said ports are in confronting relation and movement of said valve means from inlet port closing position to exhaust port closing position is assisted by flow of fluid from said inlet port.

5. Mechanism for creating a variable pressure pneumatic signal in accordance with altitude and speed of an internal combustion engine and the temperature of air supplied to a part of the engine comprising a control chamber having an outlet passage for transmitting a chamber pressure as a pneumatic pressure signal, a first relatively unrestricted inlet passage connecting said chamber to a source of fluid pressure, a shut-off valve responsive to altitude to prevent flow of fluid through said first passage above a predetermined altitude, a second inlet passage connecting said chamber to the same pressure source and terminating in said chamber in an inlet port, a relatively restricted exhaust passage having an exhaust port in said chamber, valve means in said chamber responsive to engine speed movable between a first position corresponding to low engine speed closing said inlet port and opening said exhaust port and a second position corresponding to high engine speed closing said exhaust port and opening said inlet port, and means responsive to engine air inlet temperature connected to said speed responsive means to adjust the speed responsive means as to the speed at which said valve means opens said inlet port and closes said exhaust port.

6. An engine speed and altitude sensitive mechanism to deliver a relatively high positive signal pressure at low altitude irrespective of engine speed, a relatively low positive signal pressure while a minimum altitude is maintained and while engine speed is below a predetermined speed, and a relatively high positive signal pressure while said minimum altitude is maintained and engine speed is above a predetermined speed, said mechanism comprising a signal pressure chamber having an exhaust port and a restricted exhaust passage connected thereto and an outlet passage for transmitting a pneumatic signal and including a signal outlet port, a first inlet passage connecting said chamber to a source of fluid pressure, a shut-off valve responsive to altitude to remain open below a predetermined altitude to maintain a relatively high signal pressure in said chamber below said predetermined altitude whether said exhaust port is open or closed, said shut-off valve being closed at and above said predetermined altitude, a second inlet passage connecting said chamber to said source of fluid pressure and including an inlet valve port, and valve means responsive to engine speed operable below a predetermined engine speed to close said inlet valve port and to open said exhaust port to reduce the pressure in said signal chamber to said relatively low signal pressure except when below said predetermined altitude and operable above a predetermined engine speed to open said inlet port and to close said exhaust port to increase the signal pressure to said relatively high signal pressure irrespective of altitude.

7. An engine speed and altitude sensitive mechanism as defined in claim 6 in which said second inlet passage is restricted.

8. An engine speed and altitude sensitive mechanism to deliver a relatively high positive signal pressure at low altitude irrespective of engine speed, a relatively low positive signal pressure while a minimum altitude is maintained and while engine speed is below a predetermined speed and a relatively high positive signal pressure while said minimum altitude is maintained and engine speed is above a predetermined speed, said mechanism comprising a signal pressure chamber having an exhaust port in said chamber and a restricted exhaust passage connected thereto and an outlet passage for transmitting a pneumatic signal and including a signal outlet port, a first inlet passage connecting said chamber to a source of fluid pressure, a shut-off valve responsive to altitude to remain open below a predetermined altitude to maintain a relatively high signal pressure in said chamber below said predetermined altitude whether said exhaust port is open or closed, said shut-off valve being closed at and above said predetermined altitude, a second inlet passage connecting said chamber to said source of fluid pressure and including an inlet valve port in said chamber confronting said exhaust port, and valve means including a valve element in said chamber movable between said confronting ports and responsive to engine speed, said valve means being operable below a predetermined engine speed to close said inlet valve port and to open said exhaust port to reduce the pressure in said signal chamber to said relatively low signal pressure except when below said predetermined altitude and operable above a predetermined engine speed to open said inlet port and to close said exhaust port to increase the signal pressure to said relatively high signal pressure irrespective of altitude.

9. An engine speed and altitude sensitive mechanism to deliver a relatively high positive signal pressure at low altitude irrespective of engine speed, a relatively low positive signal pressure while a minimum altitude is maintained and while engine speed is below a predetermined speed, and a relatively high positive signal pressure while said minimum altitude is maintained and engine speed is above a predetermined speed, said mechanism comprising a signal pressure chamber having an exhaust port in said chamber and a restricted exhaust passage connected thereto and an outlet passage for transmitting a pneumatic signal and including a signal outlet port, a first inlet passage connecting said chamber to a source of fluid pressure, a shut-off valve responsive to altitude to remain open below a predetermined altitude to maintain a relatively high signal pressure in said chamber below said predetermined altitude whether said exhaust port is open or closed, said shut-off valve being closed at and above said predetermined altitude, a second restricted inlet passage connecting said chamber to said soure of fluid pressure and including an inlet valve port in said chamber confronting said exhaust port, and valve means in said chamber movable between said ports and responsive to engine speed and operable below a predetermined engine speed to close said inlet valve port and to open said exhaust port to reduce the pressure in said signal chamber to said relatively low signal pressure except when below said predetermined altitude and operable above a predetermined engine speed to open said inlet port and to close said exhaust port to increase the signal pressure to said relatively high signal pressure irrespective of altitude.

10. In a mechanism for creating a pneumatic signal in accordance with the altitude and speed of an internal combustion engine and the ambient temperature, a housing having an inlet port, a chamber in said housing having an exhaust port and an outlet port, a restricted exhaust passage connected to said exhaust port, signal output means connected to said outlet port, a source of high pneumatic pressure communicating with said inlet port, first conduit means arranged to selectively communicate between said inlet port and said chamber, first valve means in said chamber positioned so as to control the communication between said first conduit means and said chamber and between said outlet port and said exhaust port, speed responsive means connected to said first valve means for positioning said first valve means in accordance with engine speed, resilient means biasing said speed responsive means in a manner so as to render said speed responsive means ineffectual to vary the position of said first valve means below a fixed minimum speed, temperature responsive means cooperating with said resilient means for varying the fixed minimum speed as a function of temperature, second conduit means arranged to selectively communicate between said inlet port and said outlet port, second valve means positioned so as to control the communication between said second conduit means and said inlet port, and altitude responsive means connected to said second valve means for positioning said second valve means in accordance with altitude, said altitude responsive means being capable of completing communication between said inlet and outlet ports regardless of the speed and temperature.

11. In a mechanism for creating pneumatic signal in accordance with the altitude, speed and temperature of the inlet air of an internal combustion engine, a housing having an inlet port, an exhaust port, and an outlet port, a restricted exhaust passage connected to said exhaust port, signal output means connected to said outlet port, a source of pneumatic pressure communicating with said inlet port, a plurality of conduits selectively communicating between said inlet port and said exhaust and outlet ports, first valve means actuated in response to temperature and engine speed for controlling communication between one of said conduits and said outlet port and between said outlet and exhaust ports, second valve means actuated in response to altitude for controlling the communication of another of said conduits, said valve means being arranged so as to at times provide for additive pneumatic pressures to be transmitted to said outlet port while at other times providing for independent singular pressures to be transmitted to said outlet port.

References Cited in the file of this patent

UNITED STATES PATENTS

| | | | |
|---|---|---|---|
| 1,111,498 | Rotter | Sept. 22, | 1914 |
| 1,718,673 | Wettstein | June 25, | 1929 |
| 2,242,374 | Schultz et al. | May 20, | 1941 |
| 2,398,713 | Martin | Apr. 16, | 1946 |
| 2,467,445 | Schwendner | Apr. 19, | 1949 |
| 2,590,340 | Mordell et al. | Mar. 25, | 1952 |
| 2,619,103 | Davies et al. | Nov. 25, | 1952 |
| 2,692,545 | Arthur et al. | Oct. 26, | 1954 |
| 2,698,711 | Newcomb | Jan. 4, | 1955 |
| 2,775,254 | Stanbury | Dec. 25, | 1956 |
| 2,785,848 | Lombard et al. | Mar. 19, | 1957 |
| 2,835,265 | Brandstadter | May 20, | 1958 |

FOREIGN PATENTS

| | | | |
|---|---|---|---|
| 680,141 | Germany | Aug. 23, | 1939 |